United States Patent Office 2,864,785
Patented Dec. 16, 1958

2,864,785

ENAMEL COMPOSITION AND ELECTRICAL CONDUCTOR COATED THEREWITH

Malcolm Charlton, Cleveland, Ohio, assignor to American-Marietta Company, Cleveland, Ohio, a corporation of Illinois No Drawing. Application October 11, 1954
Serial No. 461,649

4 Claims. (Cl. 260—43)

The present invention relates to wire coating enamels and is more particularly concerned with novel enamel compositions containing a polyvinylal resin and an improved phenol-aldehyde type modifying resin.

Heretofore, electrical conductors, including magnet wire, have been insulated by the application of coatings formed from a variety of resin materials. Included in such materials have been phenolic varnishes, e. g., oil-modified phenolic resins, and more recently, polyvinyl acetals or polyvinylal resins, as they are termed in the trade. Phenol-aldehyde resins of the heat-hardenable type have been used to modify the basic polyvinylal resins to give the desired qualities. The modifying resins of United States Patent 2,307,588 have found wide use in the insulating field. However, application of enamels containing these resins has not always produced suiteble magnetic wire because of the failure of abrasion properties and because of poor resistance to halogenated hydrocarbons. In addition, many coats are frequently required, the individual coats being extremely thin, in order to deposit the requisite amount of insulating material.

Therefore, it is an object of the present invention to provide electrical conductors, including insulated magnet wire, having high flexibility, solvent resistance, moisture resistance, dielectric strength and high abrasion resistance.

It is a further object to provide wire coating enamels useful in the production of insulating coatings having high resistance to abrasion and to materials such as difluorochloromethane (Freon 22) and difluorodichloromethane.

Another object is to provide novel phenol-aldehyde resins of the substantially non-heat hardenable class that are useful in modifying conventional polyvinylal resins.

These and other objects of the present invention will be apparent to those skilled in the art to which this invention pertains.

In the present invention, an enamel composition has been provided that is especially useful in wire-coating operations, yielding coated magnet wire, for example, exhibiting unusual abrasion resistance and possessing excellent resistance to difluorodichloromethane, difluorochloromethane (Freon 12 and 22, respectively) and similar materials. Such enamels comprise a major proportion of a solvent and a minor proportion of a composition comprising (a) a polyvinylal resin and (b) phenol-aldehyde resin formed from the condensation of not over about 0.6 mol of formaldehyde with about 1.0 of a reactive cresylic acid, the ratio by weight of (a) to (b) being about 2 to at least ½. The enhanced abrasion and Freon resistance of electrical conductors coated with the enamels of the present invention is attributed in part to a novel, highly reactive phenol-aldehyde resin used to modify the conventional polyvinylal resins and in part to the unusually high ratio of phenol-aldehyde modifying resin solids to polyvinylal resin solids employing in formulating the enamel. The latter ratio, very substantially higher than that conventionally employed in modified polyvinylal resin enamels, tends to reduce the percentage of soluble components present in the coated wire and thus materially enhances resistance to Freon and other solvent materials with which the magnet wire, for example, is frequently contacted, as in hermetic units used in refrigeration processes. The novel conductors of the present invention are thus provided with a hard, flexible, abrasion and Freon-resistance coating, said coating being the heat-treated reaction product of the novel coating enamels.

It is believed that in the conventional phenol-aldehyde-polyvinylal (Formvar) enamels, wherein cresylic acids are employed as the primary modifying phenolic body, the cresylic acid fraction (mixed phenols) contains about fifty percent meta-para-cresol, ten percent phenol, seven percent ortho-cresol, fifteen percent symmetrical 1,3,5-xylenol and the balance, less-reactive xylenols (about eighteen percent). At least about 0.8 mol of formaldehyde is then reacted with 1.0 mol of the cresylic acid fraction until a resin having the desired viscosity range is achieved. The modifier resin is generally diluted to about 40–50 percent solids, a viscosity of from 400–900 centipoises at 25 degrees centigrade resulting.

In the compositions of the present invention, the phenol-aldehyde modifying resin is preferably prepared from phenolic compounds which have a "potential activity" or desire to react with an aldehyde, e. g., formaldehyde. The straight meta-para-cresol having a boiling range of about three degrees centigrade and consisting of about 98 percent straight meta-para-cresol and only about two percent less reactive phenolic materials is the preferred embodiment. This straight meta-para-cresol constituting the preferred embodiment is available in commerce and its composition is known as defined at page 604 of volume 4 of Othmer, "Encyclopedia of Chemical Technology," published by Interscience in 1949, as mixtures of meta and para cresol with a distilling range specification of 3° C. including the true boiling points of meta- and para-cresol. Other reactive cresylic acids include straight meta-cresol. Reactive resorcinols and trihydroxy compounds are operative but the less-reactive xylenols have not been employed satisfactorily. Molar ratios of between about 0.1 and about 0.6 aldehyde to about 1.0 reactive phenolic material or body are preferred, the 0.5 to 1.0 ratio yielding a modifying resin of the non-heat hardenable class that finds especial applicability in the wire-coating enamels of the present invention. Ratios of formaldehyde to reactive phenolic material of 1 to 1 and 1.5 to 1 have been prepared and used to modify polyvinylal resins but do not give as satisfactory results in terms of abrasion resistance as the preferred lower ratios. These higher ratio compositions do not appear to possess the desired molecular arrangement exhibited by the preferred compositions. The interaction of the phenol material with the aldehyde is generally continued until a viscosity on the Gardner-Holdt scale of between about C and I is achieved, the viscosity and refractive index being used as measures of the degree of completeness of the resin having the proper reactivity. Modifying resins having a viscosity as high as W–Y are not as satisfactory. Conventional phenol-aldehyde condensation catalysts can be employed, basic compositions such as triethanolamine being preferred. In general, it has been found that fast, modifying resins play an important role in the subsequent performance of wire-coating enamels embodying such resins and the slower acting, modifying resins are not satisfactorily employed.

In formulating the novel coating enamels, the polyvinyl acetals are employed with the improved modifying resin of the present invention. The preferred polyvinyl acetal is polyvinyl formal, formed from the interaction of formaldehyde with a partially hydrolyzed polyvinyl acetate according to the method of United States Patent 2,085,995 (see Comparative Example A).

It has been found that 2 parts by weight of polyvinylal resin solids to at least ½ part by weight of modifier resin solids is preferably employed, with the over-all solids content of between about 15.0 and 17.5 percent in the finished enamel being desired. The operable range is from 2 to ½ to as high as 2 to 2¼ or more of polyvinylal resin solids to phenol-aldehyde modifying resin solids, the upper limit being determined more precisely by ascertaining the ratio at which the use of the enamel results in a brittle or unstable coating when finally cured on the wire or other coated surface. The ratio range of from about 2 to 1½ to 2 to about 2 is preferred, especially since enamels having these ratios produce desired electrical conductors possessing very high solvent and/or Freon resistance, as well as excellent abrasion resistance. Ratios of 2 to less than ½ are not completely satisfactory.

It is necessary to maintain a viscosity of between about 4,000 and 4,600 centipoises at thirty degrees centigrade in order to float the wire coating dies at the application temperature and any substantial deviation from the preferred enamel solids content produces viscosities beyond the ordinary operable working limits. In formulating the finished enamel, aromatic diluents such as the coal tar naphthas, e. g., hi-flash naphtha, benzene, toluene, and the like may be employed together with solvents, such as the cresylic acids, xylenols, phenols and a variety of alkanols and aralkanols. Mixtures of the diluents and solvents are preferably employed in the preparation of the finished coating enamel.

The following examples illustrate the compositions and processes of the present invention but are not to be construed as limiting the same.

*Comparative Example A.—Conventional un-modified polyvinylal enamel*

One hundred parts of polyvinyl acetate was dissolved in 185 parts of glacial acetic acid and to this admixture was added 83 parts by weight of Formalin solution (37.5 percent formaldehyde) and 6.8 parts by weight of concentrated sulfuric acid. The resulting composition was heated, with continual agitation, for a period of twenty hours at seventy degrees centigrade. Thirteen parts by weight of ammonia solution was then added, the resulting neutralized polyvinylal resin precipitating as threads in water. The resin was further washed and dried in a current of warm air maintained at about sixty degrees centigrade. (See procedure of U. S. Patent 2,085,995. A resin purported to have been prepared in substantially this manner has been marketed by the Shawinigan Products, Inc., as "15–95 E. Formvar." The composition of the Formvar is reported to include up to six percent hydroxyl groups, up to thirteen percent acetate groups and about 81 percent formal groups.)

The polyvinylal resin in a $F_2$ cresylic acid and an aromatic solvent (Solvesso 100) admixture was applied to standard A. W. G. No. 16 (0.0508) hard drawn shaved copper wire to a 2.8 mil over-all build at ten feet per minute in four coats and the abrasion value determined by the standard General Electric repeated scrape abrasion meter. The abrasion value is considered a measure of polymer strength and the following values, as well as those reported elsewhere throughout this specification, are generally based upon a standard deviation of 32 individual values.

*Abrasion "as is"*—15.7±2.7
*Abrasion after annealing*—18.2±3.1

The term Abrasion "as is" throughout the specification refers to abrasion values per mil thickness of coating taken on wire as it leaves the wire coating machine, whereas the "annealed" abrasion values refer to those obtained from wire that has been subjected to a 15-minute heat or bake treatment at 150 degrees centigrade after leaving the wire coating machine, unless otherwise specified. (The purpose of obtaining data on these two types of abrasion was to determine the completeness of cure of the resin system on the wire as it left the machine and on the wire after heat treatment to ascertain whether or not a certain amount of resin activity might be converted during the latter treatment to useful purposes.)

The above wire, when passed through the oven for about one minute bake at 275 degrees centigrade, resisted the 50–50 and 70–30 alcohol-toluol boiling test, as well as the ten minute boiling toluol and alcohol tests, respectively. Utilizing the composition of this example, the standard A. W. G. No. 16 wire was coated to an over-all build of 2.7 mils in 12 coats at varying wire speeds. The standard toluol-methanol extractable test (see discussion of test in Example 3), was conducted on the 12 and 14 foot coating speed wires, respectively, and extractable percentages of 10.6 and 8.0, respectively, obtained, indicating unsatisfactory resistance to Freon.

*Comparative Example B.—Conventional phenol-aldehyde modified polyvinylal enamel*

The polyvinylal resin was prepared according to the method of Comparative Example A.

The modifying resin (phenol-formaldehyde) was prepared by reacting 750 parts by weight of the mixed phenols (cresols) with 448.4 parts by weight of formalin (37.2 percent formaldehyde) in the presence of 23.9 parts of triethanolamine (commercial grade) at atmospheric pressure at the boiling point (94–98 degrees centigrade). The mol ratio of formaldehyde to cresol was thus about 0.8 to 1.0. The reaction was completed in about two hours and the resulting resin cooled to about 30 degrees centigrade and dehydrated under reduced pressure, leaving a clear, semi-solid, viscous, heat hardenable resin at room temperature. When heated for seven hours, a sample of the resin cured to a hard, substantially infusable amber-colored mass. (See Example 1 of U. S. Patent 2,307,588.)

A wire-coating enamel was prepared having 5.33 parts by weight resin solids of the phenol-formaldehyde modifying resin and 10.67 parts by weight resin solids of polyvinylal resin (a 2.0 to 1.0 resin solids ratio of polyvinylal resin to modifying resin) in a solvent admixture composed of 25.2 parts cresol (a mixed cresylic acid, known as "thinner grade," containing approximately 20 percent meta-para cresol and the remainder of less active cresols and xylenols) and 58.80 parts naphtha.

The enamel composition was applied to the standard A. W. G. No. 16 copper wire to an over-all build of 3.0 mills, six coats at a coating speed of between about twelve and fifteen feet per minute being required to achieve smooth wire. The following abrasion values were obtained in the manner of Comparative Example A:

| Feet per min. | Abrasion "as is" | Abrasion after annealing |
|---|---|---|
| 12 | 16.7 | 15.7 |
| 15 | 15.0 | 18.7 |
| 16 | 15.3 | 17.0 |

The wire, when baked in the standard manner as described in Example A resisted the 70–30 alcohol toluol mixture for five minutes and a 50–50 mixture for ten minutes, while showing resistance to the boiling toluol per se but not to the boiling alcohol per se.

In like manner, the composition of this example was applied to the standard A. W. G. No. 16 wire in 12 coats at varying wire speeds and the resulting wires subjected to the standard toluol-methanol extractable test, i. e., the extraction of the soluble components to determine the resistance to Freon. The extractable percentages obtained were 7.13 and 7.45, both samples containing more soluble matter than the maximum 7.0 percent allowed by the test standard.

*Comparative Example C.—Conventional phenol-aldehyde modified polyvinylal enamel*

Modifying resins of the type described in Comparative Example B were prepared using various cresylic acids as the principal modifying resin material and in which the molar proportion of formaldehyde to cresylic acid was varied:

(1) One-half mol of formaldehyde and 1.0 mol of a cresylic acid mixture comprising about fifty percent meta-para cresol and about fifty percent higher boiling xylenols ("slower cresylic acids") were reacted according to the method of Comparative Example B and the resulting modifying resin incorporated with the standard polyvinylal resin (Formvar) in the same ratio and in the manner of Comparative Example B to give the wire-coating enamel.

Application of the enamel to the standard A. W. G. No. 16 wire to a 3.1 mil over-all build was made at varying speeds in six coats and the following standard abrasion values obtained:

| Feet per min. | Abrasion "as is" | Abrasion after annealing |
| --- | --- | --- |
| 15 | 21.6 | 20.9 |
| 16 | 17.1 | 14.5 |
| 17 | 14.8 | 12.6 |
| 18 | 12.3 | 9.4 |
| 19 | (¹) | (¹) |

¹ Rough wire.

(2) In like manner, a modifying resin consisting of a ratio of 1.0 mol of formaldehyde to 1.0 mol of a cresylic acid mixture containing fifty percent meta-para cresol and the remainder higher boiling xylenols was prepared and incorporated with the standard polyvinylal resin in the same ratio and in the manner of Comparative Example B and the resulting enamel applied to the standard wire to an over-all build of 2.9 mils utilizing five coats and varying the coating speeds. The following standard abrasion values were obtained:

| Feet per min. | Abrasion "as is" | Abrasion after annealing |
| --- | --- | --- |
| 15 | 24.1 | 22.4 |
| 16 | 23.8 | 24.5 |
| 17 | 21.7 | 24.1 |
| 18 | 21.4 | 24.5 |
| 19 | (¹) | (¹) |

¹ Rough wire.

It was noted that the abrasion values in this example as well as those in the Comparative Examples A and B showed very little significant change upon annealing but the over-all values were in the range commonly accepted in the trade, as being satisfactory for good commercial magnet wire.

The enamel composition of this example exhibited somewhat poorer solvent resistance than the standard alcohol-toluol boiling tests, probably indicating incompleteness of curing to some extent.

*Example 1.—Phenol-aldehyde modified polyvinylal resin*

Following the procedure of Comparative Example A, the standard polyvinylal resin (Formvar) was prepared.

The modifying resin was prepared by admixing 1520 parts of weight of meta-para-cresol, having a boiling range of about three degrees centigrade, and comprising about 98 percent straight meta-para-cresol and about two percent substantially less reactive phenolic bodies that did not include 1,3,5-xylenols, and 222.0 parts by weight of 95 percent paraformaldehyde (ratio of formaldehyde to cresol being about 0.5 to 1.0 mol), in the presence of 17.6 parts by weight of triethanolamine (commercial grade). The admixture was heated in a flask with continual agitation according to the following schedule:

| Time (minutes) | Temperature, ° C. |
| --- | --- |
| At start | 30 |
| 5 | 31 |
| 10 | 33 |
| 15 | 36 |
| 20 | 40 |
| 25 | 47 |
| 30 | 53 |
| 35 | 60 |
| 40 | 67 |
| 45 | 78 |
| 50 | 85 |
| 55 | 92 |
| 60 | 97 |
| 65 | 99 |
| 70 | 85 |
| 75 | 89 |
| 80 | 92 |
| 85 | 94 |
| 90 | 94 |
| 100 | 94 |
| 105 | 94 |
| 110 | 94 |
| 115 | 94 |
| 120 | 94 |

The reaction was discontinued and the resin thinned with 252.8 parts of cresylic acid (Monsanto thinner grade). Forty-eight hours after preparation, the viscosity of the modifying resinous composition at 25 degrees centigrade, was 100 cp. of "D" on the Gardner-Holdt scale and the solids content (200 degrees centigrade for one-half hour) was 45.2 percent.

A wire-coating enamel was then prepared according to the following formulation:

| | Parts |
| --- | --- |
| Aromatic solvent (Solvesso 100) | 43.42 |
| Higher boiling aromatic solvent (Solvesso 150) | 4.83 |
| Polyvinylal resin | 11.00 |
| Cresol (thinner grade cresylic acid, comprising about twenty percent meta-para-cresol and the remainder xylenols in a boiling range up to 230 degrees centigrade) | 28.60 |
| Modifying resin solution containing 45.2 percent solids | 12.15 |
| Total | 100.00 |

The enamel was produced in conventional manner by first preparing an admixture of the modifying resin, aromatic solvents and thinner grade cresylic acid, followed by slow addition, accompanied by continual stirring, of the solid polyvinylal resin. (Alternatively, the enamel can be prepared by dispersing the polyvinylal resin in the aromatic solvent and adding the resulting dispersion to the modifying resin solution thinned with a cresylic acid.)

The viscosity at thirty degrees centigrade of the finished enamel was 4720 centipoises and the solids content was 16.7 percent as measured by the standard procedure of heating a given sample at 200 degrees centigrade for one-half hour. The ratio of polyvinylal resin solids to modifying resin solids was 2 to 1.

The enamel was applied to the standard A. W. G. No. 16 wire to an over-all build of 3.1 (3.1 over-all increase in diameter) in four coats at varying wire speeds and the resulting coated wires subjected to the standard abrasion tests, yielding the following data:

| Feet per min. | Abrasion "as is" | Abrasion after annealing |
|---|---|---|
| 10 | 21.9 | 19.4 |
| 12 | 26.1 | 21.9 |
| 14 | 27.1 | 26.1 |
| 15 | 27.1±4.5 | 28.1±4.1 |
| 16 | 22.3±2.0 | 27.4±4.8 |
| 17 | 25.2±4.4 | 28.4±3.6 |
| 18 | 20.6±4.8 | 26.8±3.3 |
| 19 and faster is rough wire | | |

The enamel was used with a slightly different type of die, giving a thinner individual coat, and five coating passes utilized in building up a 3.1 over-all increase in diameter, using the standard A. W. G. No. 16 wire, and abrasion values determined for various coating speeds:

| Feet per min. | Abrasion "as is" | Abrasion after annealing |
|---|---|---|
| 10 | 17.4±3.2 | 22.6±4.1 |
| 12 | 17.1±2.6 | 22.9±4.0 |
| 14 | 21.0±3.2 | 27.1±3.3 |
| 16 | 20.0±2.4 | 30.3±4.0 |
| 18 | 21.0±5.0 | 27.7±5.4 |
| 19 | 23.2±4.3 | 30.0±5.3 |
| 20 | 21.0±4.5 | 27.7±4.2 |
| 21 and faster is rough wire | | |

In like manner, the constant 3.1 over-all build was achieved by application of six coats of enamel at varying coating speeds with the standard wire. The following abrasion values were obtained.

| Feet per min. | Abrasion "as is" | Abrasion after annealing |
|---|---|---|
| 20 | 24.8±4.4 | 34.5±3.5 |
| 21 | 23.9±5.5 | 31.9±3.4 |
| 22 and faster is rough wire | | |

It is noted in the faster wire speeds, or with decreased bakes, that the coated wire exhibited abrasion results after annealing of marked improvement over the abrasion values of wire not subjected to the heat-treatment step. In certain batches of enamel it has been noted that the improved abrasion results are attained at once and do not require an after-bake to complete the result. This may be due to a natural variation in resin curing speeds.

The alcohol-toluol completeness of cure test revealed that there was a considerable difference in the type of polymer formed on the wire by the enamel of this example as compared with those enamels of Comparative Examples B and C. The polymer, in addition to mixed alcohol-toluol resistance, exhibited good resistance to ten minutes boiling in toluol and demonstrated partial resistance to a boiling alcohol test.

*Example 2.—Phenol-aldehyde modified polyvinylal resin*

Following the procedure of Comparative Example A, the standard polyvinylal resin (Formvar) was prepared.

Following the procedure of Example 1, a batch of the modifying resin was prepared from the same raw materials but utilizing the following weights.

| | Pounds |
|---|---|
| 3° C. meta-para cresol | 760 |
| Paraformaldehyde (Du Pont product) | 105 |
| Triethanolamine | 9 |
| Monsanto thinner grade cresylic acid | 127 |

These materials were heated together in a steel kettle with agitation under the following time-temperature schedule:

| Time (minutes): | Temperature, °C. |
|---|---|
| At start | 30 |
| 3 | 35 |
| 6 | 38 |
| 10 | 40 |
| 18 | 43.5 |
| 22 | 49 |
| 26 | 52 |
| 35 | 54.5 |
| 40 | 60 |
| 50 | 69 |
| 54 | 70 |
| 60 | 80 |
| 64 | 84.5 |
| 67 | 87 |
| 72 | 91 |
| 76 | 90 |
| 80 | 88 |
| 95 | 90.5 |
| 99 | 94.5 |
| 103 | 97 |
| 117 | 94 |

The product was cooled and thinned as rapidly as possible. It possessed a viscosity of 135 cp. and a solids content of 39.01 percent by weight.

This modifier resin product was then used in a batch of wire-coating enamel according to the following formulations:

| | Lbs. | Parts |
|---|---|---|
| Aromatic solvent (Solvesso 100) | 2,990 | 44.1 |
| High boiling aromatic solvent (Solvesso 150) | 340 | 5.0 |
| Polyvinylal resin | 760 | 11.0 |
| Thinner grade cresylic acid | 1,760 | 25.9 |
| Modifying resin solution (containing 39.01 percent solids) | 950 | 14.0 |
| | | 100.0 |

The enamel was prepared in the manner detailed in Example 1.

The viscosity at 30° centigrade of the finished enamel was 4280 cp. and the solids content was 17.12% as measured by the standard procedures. The ratio of polyvinylal resin solids to modifying resin solids was 2 to 1.

The enamel was applied to the standard A. W. G. No. 16 wire to an over-all build of 3.1 increase in diameter, as in Example 1, in six coats as a testing procedure of the particular batch. The wire passed all the usual wire coating tests, and in addition, possessed the following very high abrasion values, checking substantially the results of Example 1:

| Feet per min. | Abrasion "as is" | Abrasion after annealing |
|---|---|---|
| 14 | 32.9 | 26.8 |
| 17 | 37.7 | 30.3 |
| 20 | 38.7 | 39.7 |

It is noted that the abrasions in this case are equal to the values from the compositions of Example 1 after annealing, and that annealing did not add to the values. These results indicate that the enamel was perhaps slightly more reactive within the meaning of the present invention, resulting in the higher values being obtained in the original baking treatment in formation of the coated wire. This is further confirmed by the fact that the harder baked wires have somewhat lower values and that annealing them at 150° C. actually lowers these values to a further degree. It is known to those skilled in the art that abrasion values, as a rule, vary from rather low values on over-baked wire through a maximum value on properly baked wire to a low value on under-baked wire. It has been observed that, in general, the compositions of the present invention give a wider range of abrasion values than previously known materials, when handled within the scope of the method utilized with the compositions of the present invention.

*Example 3.—Phenol-aldehyde modified polyvinylal resin*

Following the procedure of Comparative Example A, the standard polyvinylal resin (Formvar) was prepared.

Following the procedure of Examples 1 and 2, a batch of the formaldehyde-meta-para-cresol modifying resin was prepared from the same raw materials.

Following the procedure of Example 1, a wire-coating enamel was prepared in which the ratio of polyvinylal resin solids to modifying resin solids was 2 to 1 11/4, instead of the 2 to 1.0 ratio of the enamel of Example 1.

The enamel was applied to the standard A. W. G. number 16 wire to an over-all build of 3.0 mils in twelve coats at varying wire speeds and the resulting coated wires subjected to the standard abrasion tests, yielding the following data:

| Feet/per min.: | Abrasion "as is" |
|---|---|
| 12 | 31.7 |
| 14 | 43.3 |
| 16 | 45.8 |
| 18 | 48.8 |

Comparable values were obtained when the enamel was applied to the standard wire to the same over-all build in six coats.

The resistance to Freon 12 and 22 (difluorodichloromethane and difluorochloromethane, respectively) was determined by a standard methanol-toluol extraction test in the following manner:

A 20-gram sample of the coated wire was formed into a 1⅞ inch diameter coil, cleaned with petroleum solvent and weighed to an accuracy of ⅒ milligram. The clean wire was subjected to twelve, 15 minute cycle extractions in a 300 milliliter soxhlet extractor containing 225 milliliters of reagent grade toluol. The toluol extractions and two, 10-milliliter toluol washings of the extraction flask were transferred to an accurately weighed 250 milliliter beaker, the combined extractions and washings evaporated to about 15 milliliters in volume and then dried for a period of 1½ hours in an oven at 300° Fahrenheit. A constant weight residue was obtained and weighed at room temperature. Following the same procedure, methanol was substituted for toluol and a 6 cycle extraction period conducted. The coil was then immersed in boiling 75 percent phosphoric acid until the resin turned black in color (about 60 seconds), thereafter rinsed in running water and the resinous film residue removed by soft cotton. The wire was rinsed with water and denatured alcohol, respectively. Afer oven drying at 100° for five minutes, the bare wire was weighed and the value subtracted from the original sample weighed, giving the computed weight of the resin coating. The percent of extractables is deemed to be equal to 100 times a fraction, the numerator of which comprises the sum of the weight of the toluol and methanol extractables and the denominator of which comprises the computed weight of the resin. If the percent of extractables exceeds 7.0 percent, according to this formula, the coated wire sample fails the test and is deemed to be non-Freon resistant. Conversely, an extractable percentage of less than 7 percent indicates a Freon-resistant coated wire.

Utilizing this extractables test, samples of the 12, 14, 16 and 18 foot coating speed wires were analyzed and exhibited toluol-methanol extractable percentage of 3.6, 5.2, 6.7, and 6.6, respectively.

*Example 4.—Phenol-aldehyde modified polyvinylal resin*

Utilizing the procedure of Example 3, a wire-coating enamel was prepared in which the ratio of polyvinylal resin solids to modifying resin solids was increased to 2 to 1 1/2, instead of the 2 to 1 1/4 ratio of Example 3.

The enamel was applied to the standard A. W. G. No. 16 wire to an over-all build of 3.0 mils in six coats at varying wirespeeds and the resulting coated wire subjected to the standard abrasion tests, yielding the following data:

| Feet/per min.: | Abrasion "as is" |
|---|---|
| 12 | 39.6 |
| 14 | 49.3 |
| 16 | 52.8 |
| 18 | 52.8 |

Utilizing the extractables test of Example 3, samples of the 12, 14, 16, and 18 foot coating speed wires were analyzed and exhibited toluol-methanol extractable percentages of 1.63, 3.48, 4.75, and 6.20, respectively, indicating excellent resistance to Freon.

The resistance to Freon was further determined by a second standard testing procedure in the following manner:

The coated wire was baked in an oven at 150° C. for a period of four hours and thereafter placed in a test tube with 10 grams of difluorochloromethane (Freon 22). Sufficient presure was maintained on the test tube to keep the difluorochloromethane in the liquid state( at about 40° C.) and the wire maintained in this system for a period of from 16 to 20 hours. Thereafter, the pressure was released and the wire subjected to an additional 15 minute bake in an oven maintained at 125° C. At the completion of this test, the wire was observed microscopically, the presence of "bubbles" or "craters" indicating failure of the coated wire to meet this Freon resistance test.

Following this alternative test procedure, samples of the 12, 14, 16 and 18 foot coating speed wires of this example were tested and exhibited substantially no bubble infirmities in the coating, indicating excellent resistance to Freon.

*Comparative Example D.—Conventional phenol-aldehyde modified polyvinylal enamel*

Following the procedure of Comparative Example B above, a conventional wire-coating enamel was prepared in which the ratio of polyvinylal resin solids to modifying resin solids was 2 to 11/2, instead of the 2 to 1.0 ratio of the enamel of the Comparative Example B.

The enamel was applied to the standard A. W. G. No. 16 wire to an over-all build of 3.0 mils in 6 coats at varying wire speeds and the resulting coated wire subjected to the standard abrasion tests, yielding the following data:

| Feet/per min.: | Abrasion "as is" |
|---|---|
| 12 | 23.4 |
| 14 | 21.3 |
| 16 | 22.8 |
| 18 | 14.8 |

With a twelve coat application at varying wire speeds, the following test data was obtained:

| Feet/per min.: | Abrasion "as is" |
|---|---|
| 12 | 16.7 |
| 14 | 25.7 |
| 16 | 24.0 |
| 18 | 23.7 |

None of these samples, taken at random from both the six- and twelve-coating products, passed the toluol-methanol extractable percentage test or the alternative Freon immersion test, respectively.

*Example 5.—Phenol-aldehyde modified polyvinylal resin*

Utilizing the procedure of Example 4, a wire coating enamel was prepared in which the ratio of polyvinylal resin solids to modifying resin solids was increased to 2 to 1¾, instead of the 2 to 1 1/2 ratio of Example 4.

The enamel was applied to the standard A. W. G. No. 16 wire to an over-all build of 3.0 mils in 12 coats at varying wire speeds and the resulting coated wire subjected to the standard abrasion tests, yielding the following data:

| Feet/per min.: | Abrasion "as is" |
| --- | --- |
| 12 | 29.3 |
| 14 | 46.5 |
| 16 | 57.2 |
| 17 | 65.5 |
| 18 | 49.0 |

*Example 6.—Phenol-aldehyde modified polyvinylal resin*

Following the procedure of Example 5, a wire-coating enamel was prepared in which the ratio of polyvinylal resin solids to modifying resin solids was increased to 2 to 2, instead of the 2 to 1¾ ratio of Example 5.

The enamel was applied to a standard A. W. G. No. 16 wire to an over-all build of 3.0 mils in 12 coats at varying wire speeds and the resulting coated wire subjected to the standard abrasion test, yielding the following data:

| Feet/per min.: | Abrasion "as is" |
| --- | --- |
| 12 | — |
| 14 | 52.8 |
| 16 | 47.0 |
| 18 | 51.7 |

Samples of the 12 and 14 foot coating speed wires exhibited toluol-methanol extractable percentages of 3.8 and 4.63, respectively, indicating excellent resistance to Freon.

The conventional practice in the wire-coating industry has been to apply the coating enamels in very thin, individual layers in order to achieve homogeneity in the finished product. For example, on A. W. G. No. 16 standard wire with a desired HF coating, the practice has been to utilize a modified polyvinylal resin, as illustrated in Comparative Example B, at coating speeds of from 13 to a maximum of about 17 feet per minute under specially controlled conditions. A subsequent dry pass for one minute at 275 degrees is sometimes used, but only if necessary to complete curing. Such wire shows resistance to a 70–30 alcohol-toluol mixture for five minutes and occasional resistance to a 50–50 mixture for 10 minutes, as well as showing good resistance to boiling toluol but poor resistance to boiling alcohol. The standard abrasion values per mil thickness of coatings prepared from conventional wire enamels usually run from about 13 to a maximum of about 19 or 20 on the standard General Electric repeated scrape abrasion meter.

With the incorporation of the improved modifying composition of the present invention with the standard polyvinylal resin to give these useful enamels, coated products are produced that compare very favorably in terms of flexibility, heat and shock resistance, jerk elongation, solvent resistance, moisture resistance, and dielectric strength to the conventional coated wire, while in addition exhibiting very improved abrasion and Freon resistance. Such coated wire can be prepared in as few as four coats and at significantly increased wire coating speeds, i. e., up to 22 feet per minute. When five coats are employed to produce an HF coating to a total of a 3.1 over-all increase in diameter of the wire, the individual coat will average about 0.62 mil in thickness, whereas in the four coating operation each individual coat occupies 0.775 mil in thickness. In the former instance, about 20 percent more enamel per coat and in the latter case about 50 percent more enamel per coat is applied than in the conventional six coating operation. It is suggested that the enamels of the present invention when deposited in such unusually thick individual coats actually yields a substantially different polymer when finally cured than the conventional enamels when cured after application in very thin individual coats. It is believed that the thicker individual coat can permit the saving or retention of a substantial amount of chemical activity on the wire which is not immediately released or further reacted during the coating operation, especially since much higher wire coating speeds are employed, but which is or can be subsequently reacted or expended during the annealing operation, thereby resulting in a very enhanced abrasion resistance. The product formed from the heat-treatment of the novel enamels, when applied in a fewer number of coats to the same over-all build as obtained with a conventional enamel in a higher number of coats exhibits a substantially different density than the reaction product of the heat-treated conventional enamels. This additional fact tends to support the finding of the formation of new polymers on the completed wire. The speed of coating, as well as the amount of cross-linking and degree of cure imposed may also contribute significantly to the characteristics of the final reaction product. It has been shown (see Comparative Example B) that the conventional wire coating enamels, when coated in six passes at a speed of between about 12 and 15 feet per minute to give a smooth HF wire, do not evidence enhanced abrasion upon subsequent annealing for a period of fifteen minutes at 150° C. Speeding up of the coating time for each individual coat using conventional enamels, followed by an annealing treatment, causes only a severe reduction in solvent resistance, a significant loss in abrasion resistance, and, frequently, rough unsuitable wire, contrary to the findings when the improved enamel compositions of the present invention are coated at higher wire speeds, followed by annealing.

It is known that the standard polyvinylal resin is not completely stable under varied conditions of heat and/or catalysis, and it has been demonstrated that a substantial amount of loss or formal groups occurs in the normal baking operation, the hydroxyl and acetate radicals probably possessing somewhat stronger bonds and hence suffering less loss. The physical ability of an unusually thick individual layer to prevent loss of the formal groups, as well as causing retention of resin reactivity, may ultimately be found responsible for the increased abrasion achieved in the annealing step through greater reactivity of the improved modifying resin with the polyvinylal resin to yield a different, tougher polymer.

Further, the improved modifying resin made from the substantially straight meta-para-cresol and formaldehyde appears to be an almost completely reacted resin system prior to baking or sustained heat treatment at up to 200 degrees centigrade. For example, the initial solids content of the modifying resin appears to be close to 100 percent since applicant has been unable to remove by extraction any substantial amount of the cresylic acid thinner from the meta-para-cresol-formaldehyde solution at about room temperature. On the other hand when solids determinations were made, as reported in Examples 1 and 2, by analysis after one-half hour treatment at 200 degrees centigrade, between 40 and 50 percent only in solids remained, the balance of the modifying resin material apparently escaping as thinner. Thus, the unusual abrasion results obtained by applicant from enamels utilizing the novel modifying resin system may be attributed, in part, to the deposition of a relatively thick, wet film upon the wire that is subsequently dried or oven cured at high temperature, causing a breakdown of the resin and, concomitantly, resulting in cross linking with the polyvinylal resin (Formvar) or with other molecules of itself to yield a much tighter, integrated film. Such theory is supported by the experimental findings of higher abrasions in the thicker, wet films. In any event, the pronounced influence of the substantially non-heat hardenable modifying resin on the wire has been demonstrated.

The ability of the improved enamel compositions to be coated in thicker individual coats and at increased speeds permits substantial saving of time in the coating operation and gives greater latitude in the speed of coating. For example, with enamels containing the improved modifying resin, coating speeds of from between 10 and 22 feet per minute can be employed with A. W. G. No. 16 wire having an HF coating. At 15 feet per minute, the bake is 60 seconds, at 20 feet per minute the bake is 45 seconds and at 25 feet per minute the bake is reduced to 36 seconds, the curing of the individual coats then being appreciably diminished with increased wire-coating speeds. Applicant's operation at 20 feet per minute, for example, as compared with the standard conventional coating speed of 15 feet per minute undoubtedly provides significantly less curing of the modified resin-polyvinylal system during the coating operation, which factor together with the very substantial increase in size of the individual coating, produces a polymer that is definitely on the under-cured side upon completion of the coating operation and which after the annealing treatment is different in structure than the conventional phenol-aldehyde modified polyvinylal enamel coating produced in the customary manner. Such difference in structure may be caused by increased cross-linking between the modifying resin and the polyvinylal resin system.

The chemical characteristics of the new polymer differ substantially from those of the conventional phenol-aldehyde modified polyvinylal resin coated enamels. For example, the solvent resistance to aromatic solvents, employed in the majority of insulating varnishes, is exceptionally good. Resistance in the straight toluol test, for example, is excellent. Resistance to straight alcohol is somewhat less pronounced but recovery of the coated wire is good with no evidence of reduced adhesion being apparent. Resistance to the 70–30 alcohol-toluol mixture is acceptable. The exceptional abrasion values obtained with the method of the present invention further point to a different polymeric coating structure. Enhanced abrasion cannot be observed with the conventional phenol-aldehyde modified polyvinylal enamels when coated to the standard build with standard wire using only five coats and the maximum coating speed (about 18 feet per minute). (See Comparative Example C.) If the unusual abrasion resistance was attributable solely to higher operating speeds and thicker coats, the results of Comparative Example C experiments would have led to a finding of at least a substantial differential between the initial abrasion and the abrasion after annealing. Such is not the experimental fact, it appearing that the new polymers resulting from the completed coating operation are significantly different in structure from the conventional wire coating polymers.

The aging properties of the finished wire polymer can be controlled in part by variation in the amount of modifying resin incorporated in the enamel. For example, with a higher ratio of modifier to polyvinylal resin, the resulting reaction product can be cured completely on the wire in the normal baking time, the coated wire still retaining good flexibility. Where the optimum flexibility of the finished wire polymer is desired, the ratio of modifying resin to polyvinylal resin may be decreased somewhat. Heretofore, the use of conventional modifying resin with the polyvinylal resin has resulted in "crazing" of the ultimately cured wire product. Such crazing has been substantially reduced with the present reactive enamels of high modifier resin content since a greater degree of reaction with the polyvinylal resin is apparently achieved.

Thus, the provision of the novel modifying phenol-aldehyde resin wherein preferably only those "reactive" phenols, including "reactive cresols," are employed, with the exclusion of the non-reactive components, permits the formulation with the conventional polyvinylal resin of a novel wire-coating enamel having a higher proportion of modifier resin than in conventional enamels and which can be coated at a higher coating speed to the desired thickness with a concomitantly fewer number of coats. An improved wire-coating having greater initial abrasion upon completion of the coating operation and which may have very enhanced abrasion, as well as excellent resistance to Freon and related materials, subsequent to curing is thereby produced.

Various modifications may be made in the present invention without departing from the spirit or scope thereof and it is to be understood that the invention is limited only as defined in the appended claims.

I claim:

1. A wire-coating enamel comprising a major proportion of solvent and a minor proportion of a composition comprising as the essential resinous ingredients thereof (a) a polyvinylal resin and (b) a phenol-aldehyde resin formed from the condensation of at least 0.1 and not over 0.6 mol of formaldehyde with 1.0 mol of a reactive cresylic acid selected from the group consisting of meta cresol and mixtures of meta-cresol and para-cresol containing less than about 2% of less reactive phenolic bodies, the ratio by weight of (a) to (b) being between about 2 to at least about ½ and about 2 to about 2¼.

2. A wire-coating enamel comprising a major proportion of solvent and a minor proportion of a composition comprising as the essential resinous ingredients thereof (a) a polyvinylal resin and (b) a phenol-aldehyde resin formed from the condensation of at least 0.1 and not over 0.6 mol of formaldehyde with 1.0 mol of meta-para-cresol which consists of a mixture of meta-cresol and para-cresol containing less than about 2% of less reactive phenolic bodies, the ratio by weight of (a) to (b) being about 2 to at least about ½.

3. An electrical conductor provided with a hard, flexible, abrasion and Freon resistant coating, said coating being the heat treated reaction product of a composition comprising a major proportion of solvent and a minor proportion of a composition comprising as the essential resinous ingredients thereof (a) a polyvinylal resin and (b) a phenol-aldehyde resin formed from the condensation of at least 0.1 and not over 0.6 mol of formaldehyde with 1.0 mol of reactive cresylic acid selected from the group consisting of meta cresol and mixtures of meta-cresol and para-cresol containing less than about 2% of less reactive phenolic bodies, the ratio by weight of (a) to (b) being between about 2 to at least about ½ and about 2 to about 2¼.

4. An electrical conductor provided with a hard, flexible, abrasion and Freon resistant coating, said coating being the heat treated reaction product of a composition comprising a major proportion of solvent and a minor proportion of a composition comprising as the essential resinous ingredients thereof (a) a polyvinylal resin and (b) a phenol-aldehyde resin formed from the condensation of at least 0.1 and not over 0.6 mol of formaldehyde with 1.0 mol of meta-para-cresol which consists of a mixture of meta-cresol and para-cresol containing less than about 2% of less reactive phenolic bodies, the ratio by weight of (a) to (b) being between about 2 to at least about ½ and about 2 to about 2¼.

References Cited in the file of this patent

UNITED STATES PATENTS

| | | |
|---|---|---|
| 2,307,588 | Jackson et al. | Jan. 5, 1943 |
| 2,615,001 | Bullock et al. | Oct. 21, 1952 |

OTHER REFERENCES

"Synthetic Resins and Allied Plastics," by Morrell, 3rd edition, published in 1951 by Oxford University Press, page 131.

UNITED STATES PATENT OFFICE
CERTIFICATE OF CORRECTION

Patent No. 2,864,785                          December 16, 1958

Malcolm Charlton

It is hereby certified that error appears in the printed specification of the above numbered patent requiring correction and that the said Letters Patent should read as corrected below.

Column 1, lines 30 and 31, for "suiteble" read -- suitable --; line 69, for "employing" read -- employed --; column 2, line 7, for "resistance" read -- resistant --; column 4, line 51, for "mills" read -- mils --; column 5, line 72, for "of", first occurrence, read -- by --; column 6, line 39, for "100 cp. of" read -- 100 cp. or --; column 9, line 18, for "2 to 1 11/4" read -- 2 to 1 1/4 --; line 56, for "Afer" read -- After --; column 11, line 73, for "yields" read -- yield --.

Signed and sealed this 31st day of March 1959.

(SEAL)
Attest:

KARL H. AXLINE
Attesting Officer

ROBERT C. WATSON
Commissioner of Patents